Sept. 22, 1931. A. CARUGHI ET AL 1,824,656
PROCESS OF AND MEANS FOR MANUFACTURING CHLORIDE OF LIME
Filed Jan. 22, 1929 2 Sheets-Sheet 1
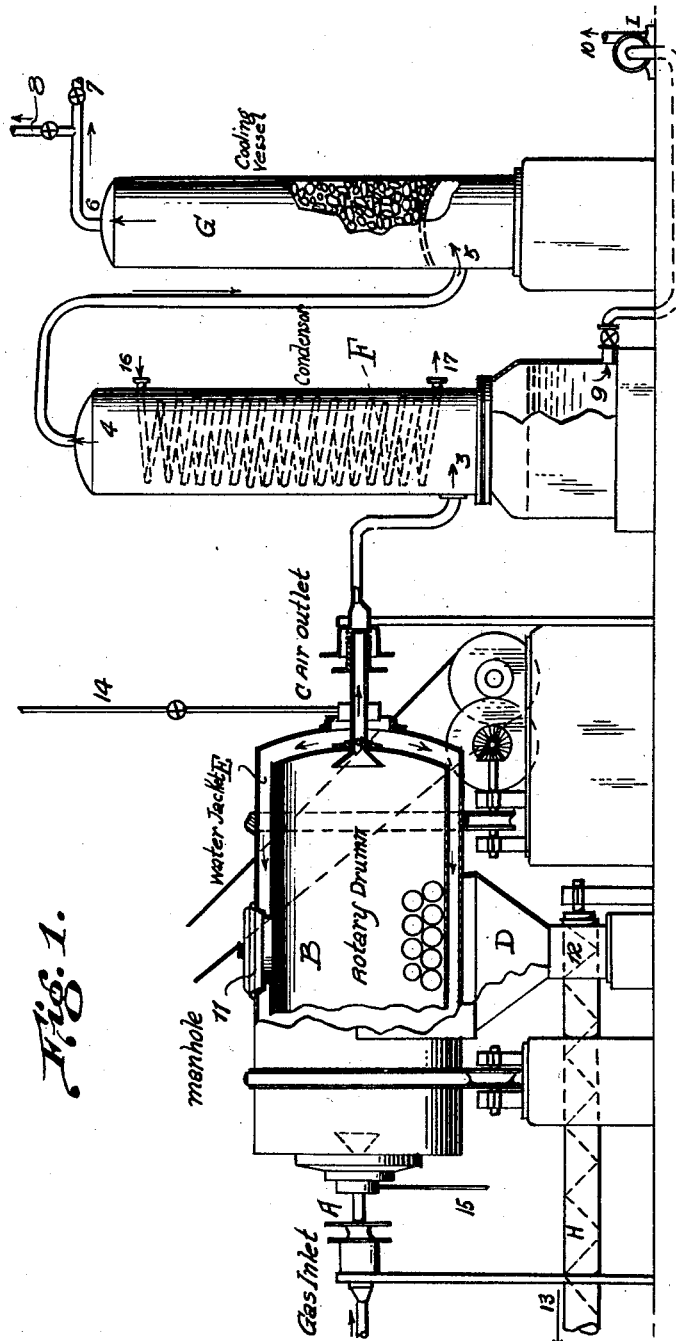
INVENTORS:
A. Carughi
C. Paoloni
BY: Marks & Clerk
ATTORNEYS.

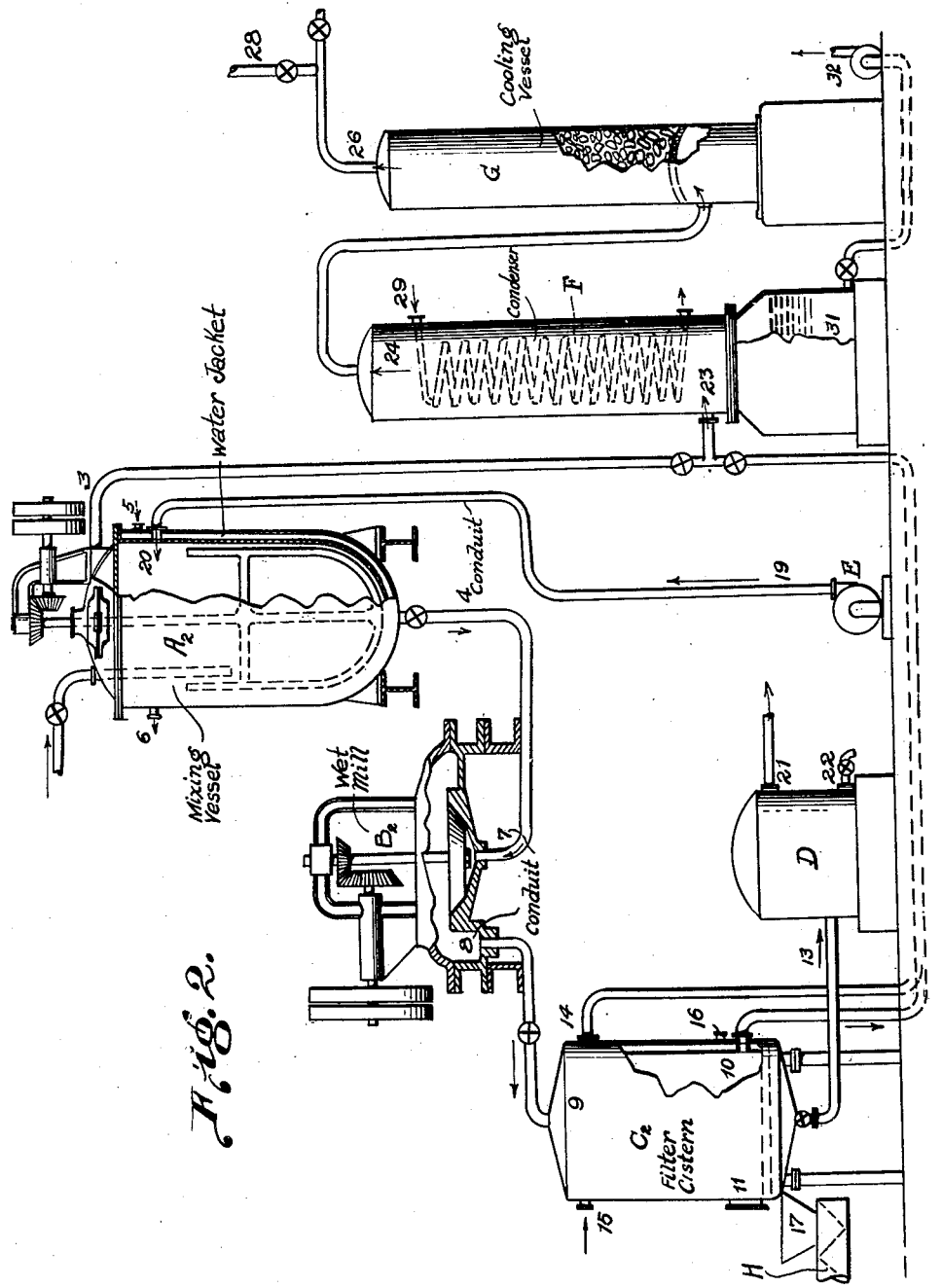

Patented Sept. 22, 1931

1,824,656

UNITED STATES PATENT OFFICE

ACHILLE CARUGHI AND CARLO PAOLONI, OF BRESCIA, ITALY

PROCESS OF AND MEANS FOR MANUFACTURING CHLORIDE OF LIME

Application filed January 22, 1929, Serial No. 334,295, and in Italy February 1, 1928.

It is known that with the reaction between chlorine gas and slaked lime in lead chambers and in mechanical plants it is difficult, owing to the nature of the process and of the apparatus, to obtain a homogeneous bleaching powder free from occluded chlorine and containing more than 38% of available chlorine.

The present invention deals with the manufacture of a homogeneous chloride of lime, crystalline, averaging more than 40% available chlorine and free from occluded chlorine gas. It was found that by chlorinating slaked lime suspended and ground in an inert liquor which does not dissolve either lime or its hyprochlorite, as for example carbon tetrachloride, a high grade chloride of lime is obtained with more than 40% available chlorine and the more complete the wet grinding of the lime, which may be performed before or during chlorination, the higher the grade of the chloride of lime.

In such conditions the reaction between slaked lime and chlorine proceeds in the best manner, by the same nature of the process that is performed mechanically in special apparatus allowing of regulating the temperature at will.

It was further found that by keeping the temperature during the reaction above 40° C. a high grade chloride of lime is formed amorphous in form, very similar to that obtained with other processes. If however at the end of the reaction performed above 40° C. the temperature is suddenly reduced below 20° C. the chloride passes from the amorphous state to the crystalline one. In this state the hypochlorite presents a higher stability, dissolves more readily in water, without becoming coarse and may be compressed and keeps friable after compression.

The apparatus for the manufacture of chloride of lime according to the above described process is shown in Figures 1 and 2 of the accompanying drawings:—

In the first instance every step of the process viz. grinding, chlorinating, cooling down are performed in the same apparatus; in the second instance, in three distinct apparatuses.

The apparatus shown in Figure 1 is a jacketed rotary drum B with hot and cold water circulation, fitted with heavy balls which by the motion of the drum act like a pebble mill. Slaked lime and carbon tetrachloride are introduced in the ratio of 1 of the former to 3 to 4 of the latter through the manhole 11, then the drum is put in motion and chlorine gas is introduced through the pipe A. The chlorine dissolves in the carbon tetrachloride and reacts with the lime. The temperature is kept at 40–50° C. by regulating the water circulation in jacket E.

The air, primarily contained in the chlorine gas and not absorbed is let out by C and before reaching the atmosphere leaves the vapours of carbon tetrachloride, which the mechanically conveyed from the drum, in the condenser F, by cooling down, and in the recovering vessel G, by absorption.

After having performed the reaction, the entrance of chlorine is closed and the temperature of the sludge is rapidly brought down below 20° C. by means of cold water that circulates in the jacket E. In such conditions the chloride of lime assumes the crystalline form. The outlet to the atmosphere is then closed and vacuum is maintained through the condenser and the recovering vessel. In this way a vacuum distillation by low temperature is effected and the carbon tetrachloride is recovered by cooling down in the condenser F and by absorption in recovering vessel G. The chloride of lime freed from tetrachloride of carbon is automatically discharged.

Figure 2 shows a mixing apparatus A where chlorination of lime suspended in carbon tetrachloride in proportion of 1 of the former to 5 to 6 of the latter occurs. By means of the jacket the chlorination temperature is kept at 40°–50° C. As soon as the chloride of lime formed titrates more than 33% of available chlorine, the chlorinated mixture passes, always in the presence of carbon tetrachloride, to the wet-mill B where it is finely ground and returns through the vessel C to the mixing apparatus A where chlorination is definitively performed, always at 40–50° C. The reaction finished, the temperature of the sludge is brought down below 20° C. by means of the jacket and mixing is carried on until a crystalline chloride of lime is obtained. Thereafter the sludge is discharged from the mixing apparatus A through conduits 4, 7, 8 and 9 into apparatus C that acts as a filter.

In this manner part of the tetrachloride of carbon is recovered by filtration, and that left occluded in the chloride is distilled by vacuum.

Condenser F and recovering vessel G for both the vapours of carbon tetrachloride mechanically conveyed by the residual gases of chlorination and those distilled by vacuum act as indicated in Figure 1.

Having now particularly described and ascertained the nature of our said invention and in what manner the same is to be performed, we declare that what we claim is:—

Process for manufacturing a crystalline, stable, high grade chloride of lime, which consists in causing chlorine to act upon slaked lime suspended and ground in carbon tetrachloride at a temperature above 40° C. and causing the temperature at the end of the reaction to drop below 20° C., the chloride of lime thus obtained being then freed by vacuum from the liquid and finally dried.

Signed this 4th day of Jan. 1929.

ACHILLE CARUGHI.
CARLO PAOLONI.